Dec. 23, 1952  A. J. PATCH  2,622,426
SPRINGING DEVICE FOR PRESSURE ROLLERS
Filed Jan. 20, 1950  6 Sheets-Sheet 1
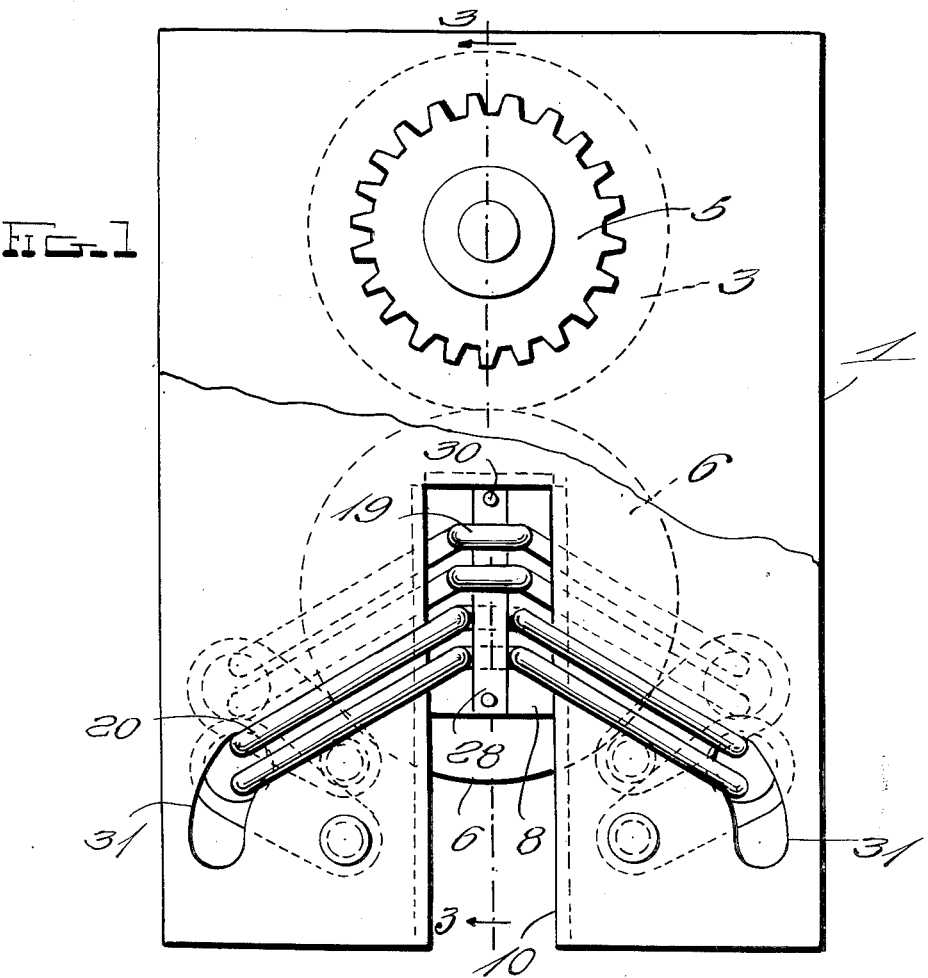
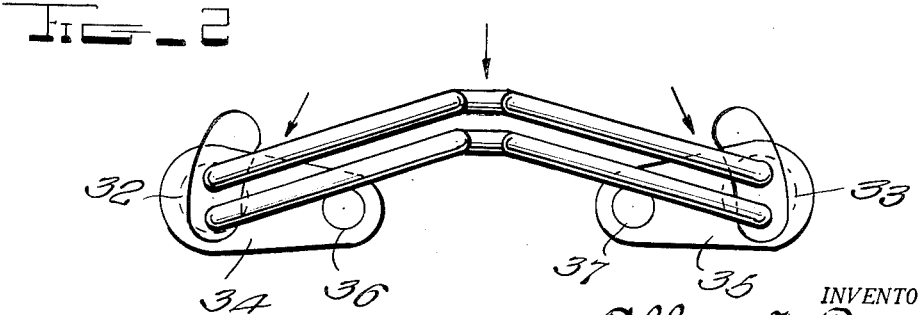
INVENTOR.
Allen J. Patch,
BY
Lloyd W. Patch
ATTORNEY Dec. 23, 1952 A. J. PATCH 2,622,426
SPRINGING DEVICE FOR PRESSURE ROLLERS
Filed Jan. 20, 1950 6 Sheets-Sheet 2
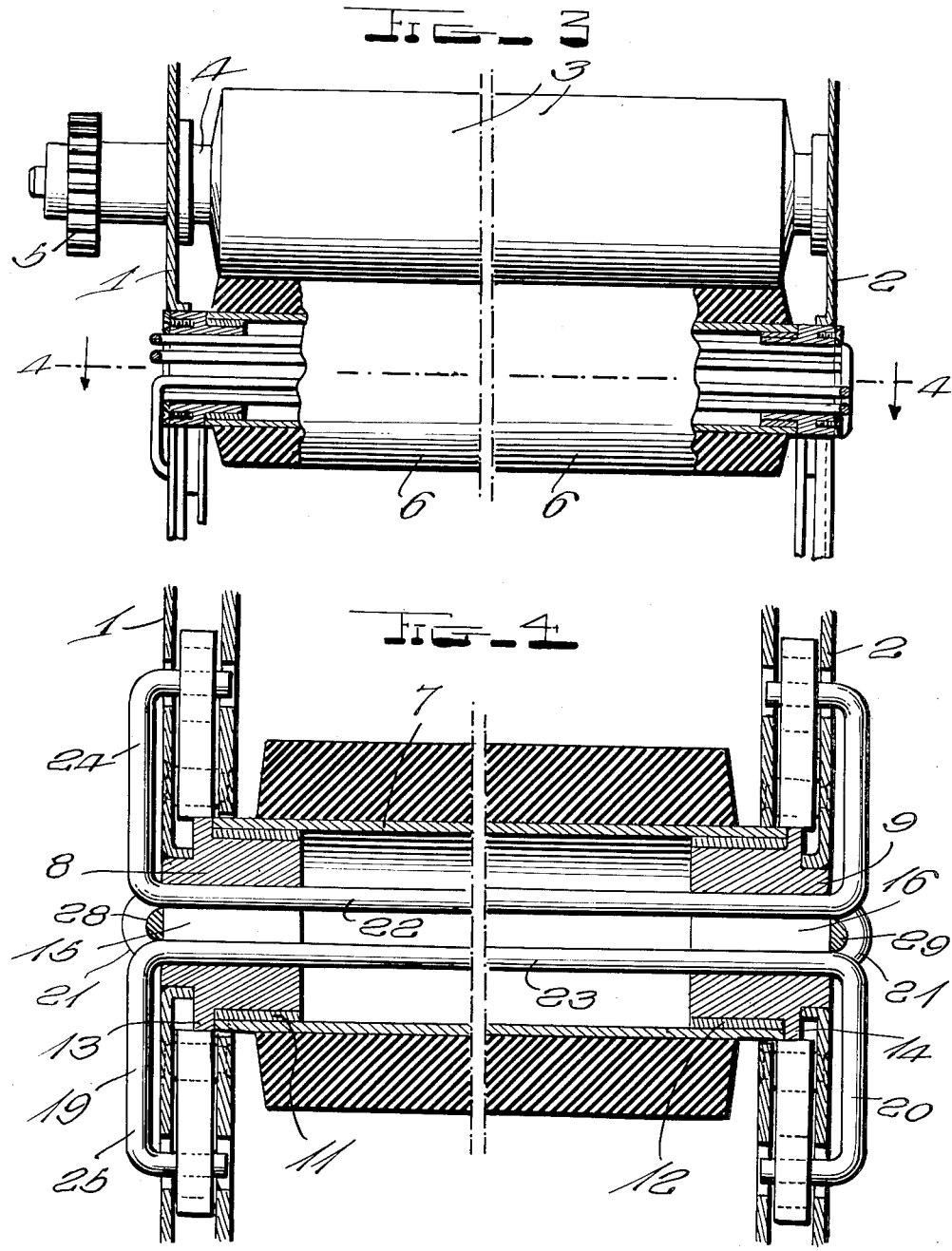

Dec. 23, 1952 A. J. PATCH 2,622,426
SPRINGING DEVICE FOR PRESSURE ROLLERS
Filed Jan. 20, 1950 6 Sheets-Sheet 3
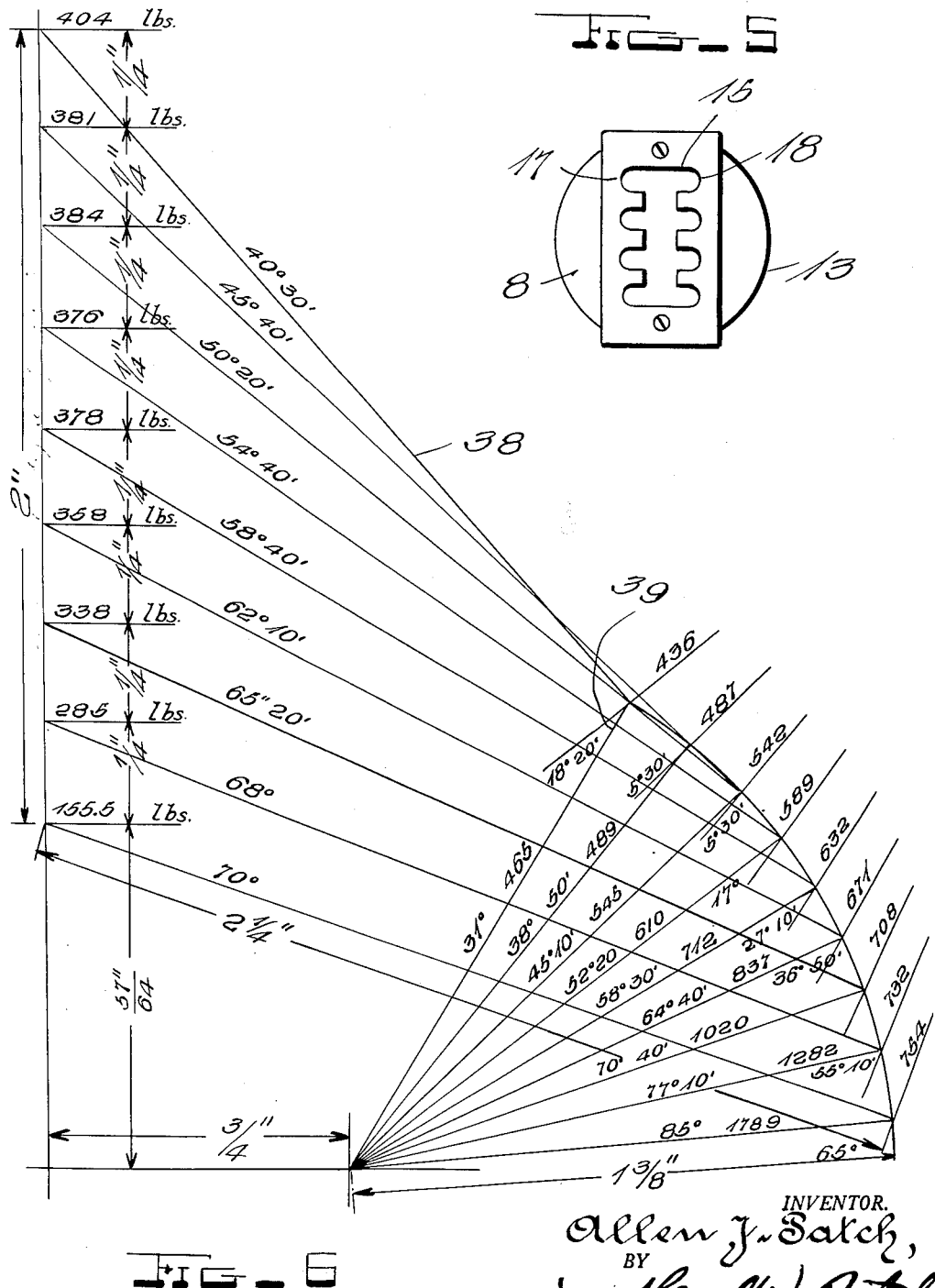
FIG_5
FIG_6
INVENTOR.
Allen J. Patch,
BY
Lloyd W. Patch
ATTORNEY Dec. 23, 1952 A. J. PATCH 2,622,426
SPRINGING DEVICE FOR PRESSURE ROLLERS
Filed Jan. 20, 1950 6 Sheets-Sheet 4
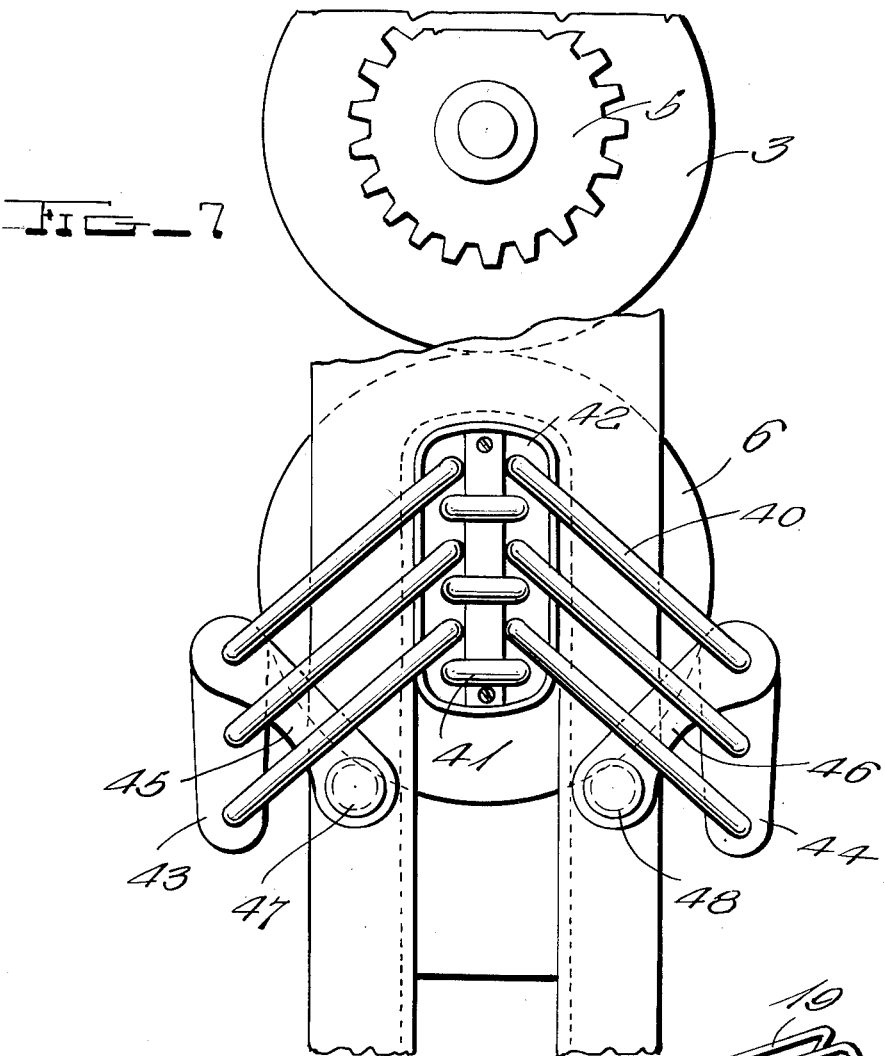
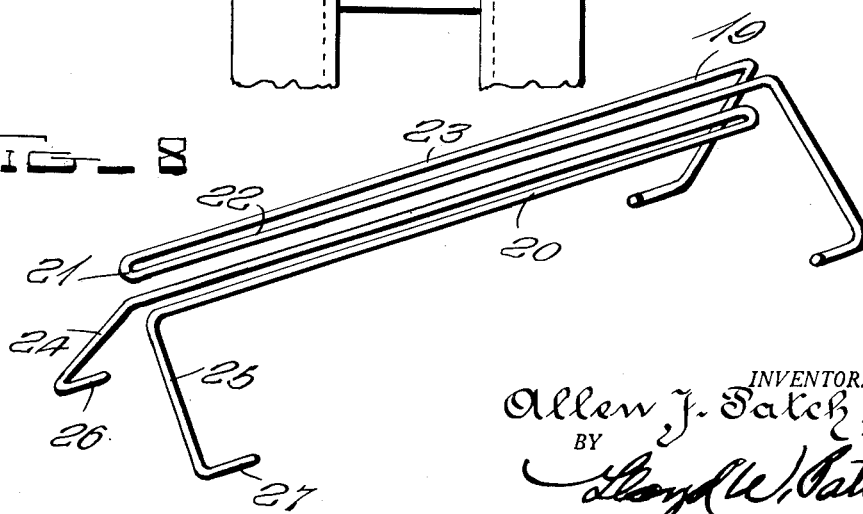
INVENTOR.
Allen J. Patch,
BY
George W. Patch
ATTORNEY Dec. 23, 1952 A. J. PATCH 2,622,426
SPRINGING DEVICE FOR PRESSURE ROLLERS
Filed Jan. 20, 1950 6 Sheets-Sheet 5
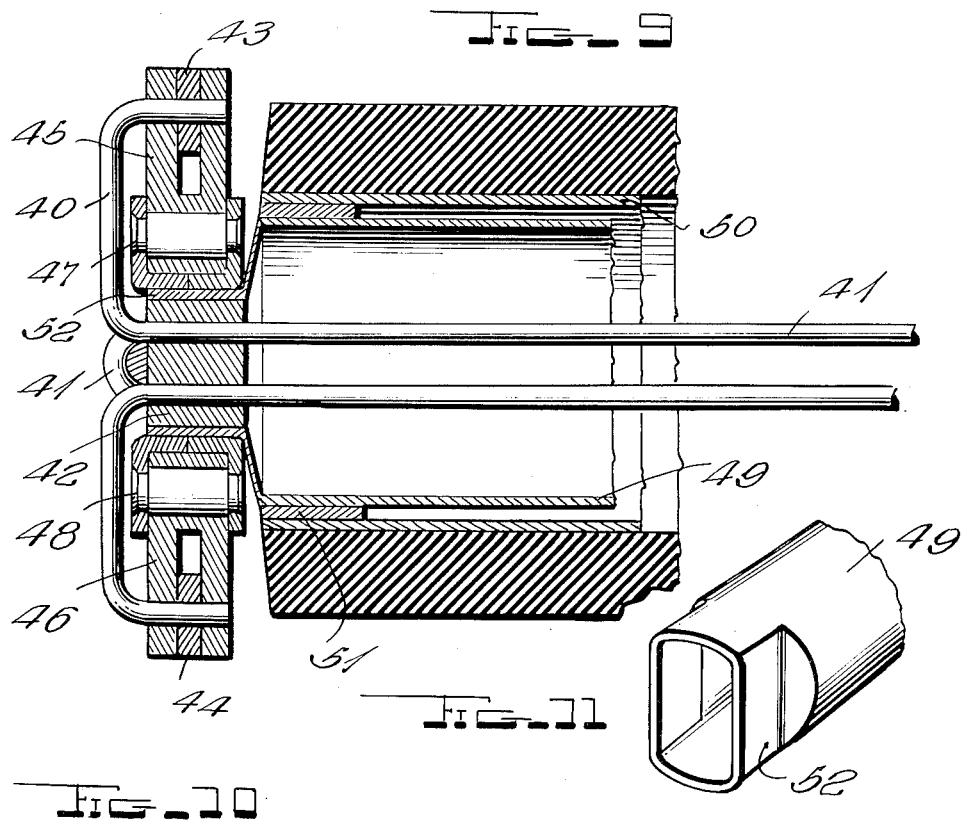
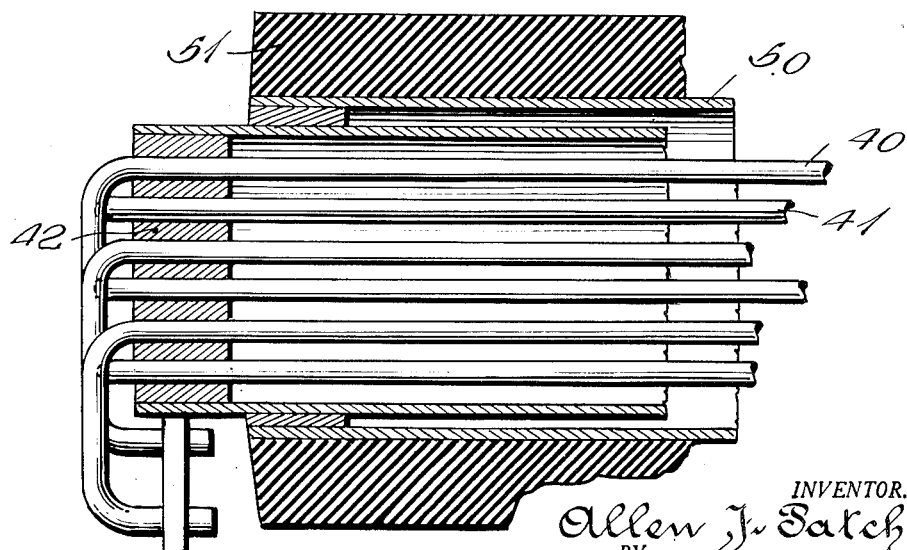
INVENTOR.
Allen J. Patch,
BY
Lloyd W. Batch
ATTORNEY

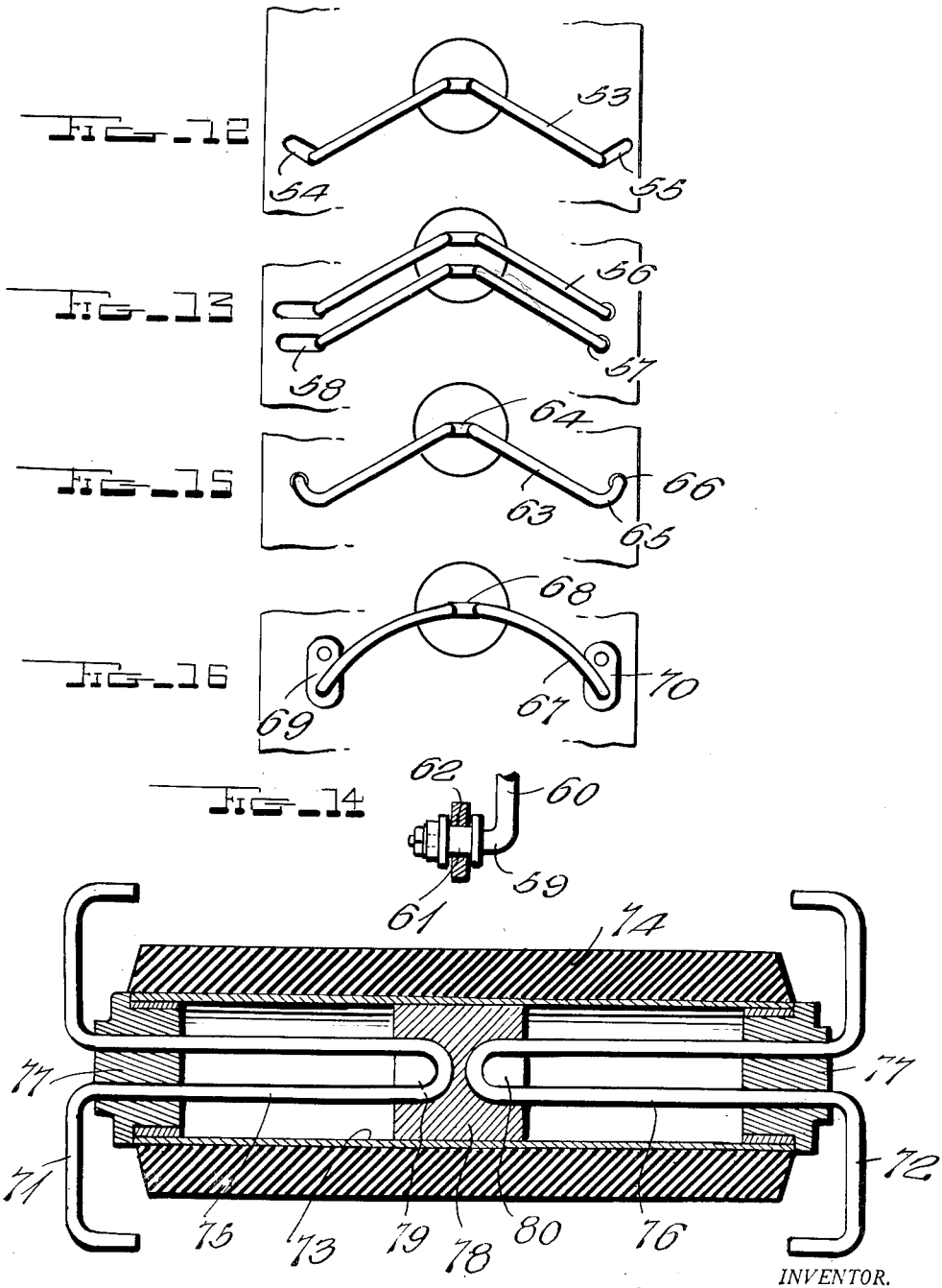

Patented Dec. 23, 1952

2,622,426

UNITED STATES PATENT OFFICE 2,622,426

SPRINGING DEVICE FOR PRESSURE ROLLERS

Allen J. Patch, Duluth, Minn.; Ruth M. Patch, Ripon, Wis., executrix of said Allen J. Patch, deceased Application January 20, 1950, Serial No. 139,697

18 Claims. (Cl. 68—256)

My invention relates to a springing device for pressure rollers, and particularly to a torsion springing device having parts thereof mounted and encased centrally within a sprung roll.

An object of this invention is to provide yieldable torsion spring mounting means for a movable pressure roller such as used for clotheswringers for removing moisture from wet clothes, for use in gluing or pressing sheet material, for bookbinding, for machines for folding paper and textiles and the like, for use in feeding of strip material, in devices for feeding and pressing strip or sheet materials, and in many other applications which require an adjustable gap yieldably spring-urged rotating sprung roll.

Heretofore it has been common practice to employ leaf spring means bridging across the end bearings of a sprung roller or extending substantially lengthwise of the roller, or to employ coiled or other compression springs over the bearings; and, with such ordinarily employed spring mountings, the size and bulk of the mounting and framing structure has necessarily been increased, while such devices will cause wide variations in the pressure exerted between the rollers as the rollers separate due to variations in thickness of the rolled material, thus at times exerting crushing or damaging pressures. Therefore, it is another purpose of my invention to provide yieldable springing means urging a pressure roller into operative position, but which springing means will permit yielding and movement of the roller to accommodate variations in the thickness of the material being rolled, without proportionately increasing or varying the pressure.

A further object of my invention is to provide a torsion spring mounting for yieldable pressure rollers wherein substantial parts of the springs are enclosed within the center of the sprung roll to thus be housed and protected and to avoid interference with the rolled material and the movement of the sprung roll.

Still another object of this invention is to provide a torsion spring device for pressure rollers wherein the roll pressures can be adjusted to suit the particular conditions of use, and with which the desired pressure can be maintained substantially constant and irrespective of the distance to which the rollers may be separated.

Still another purpose is to provide a torsional spring mounting for a movable pressure roller so constructed and so assembled with the movable roller that this roller is permitted to have axial swinging movement to give a greater degree of separation at one end than at the other, and thus accommodate irregularities in the thickness of the material passing between the rolls, while maintaining a substantially constant spring pressure upon the rolls at all points throughout the length.

Yet another object is to provide a torsion springing device consisting of a plurality of coacting torsion springs having parts thereof substantially housed and enclosed within the sprung roll, and wherein the yielding pressure is substantially proportioned and balanced between the springs and is substantially equalized as the gap between the rolls is increased.

With the above and other objects in view, some of which will be apparent to those skilled in the art, and others of which are inherent in the construction and the functioning of the parts, my invention includes certain novel features of construction and combinations and arrangements of parts which will be hereinafter set forth in connection with the drawings and then pointed out in the claims.

In the drawings:

Figure 1 is a fragmentary broken end elevational view illustrating an embodiment of my improved torsion spring mechanism with a pair of rolls such as the rolls of a wringer.

Fig. 2 is a fragmentary end elevational view of the disclosure in Figure 1 showing the yieldable torsion springs in pressured position.

Fig. 3 is a view in side elevation of the disclosure in Figure 1, and with parts illustrated in longitudinal vertical section.

Fig. 4 is an enlarged longitudinal sectional view taken substantially on line 4—4 of Fig. 3 and showing the assembly of the torsion springs with the pressure roll.

Fig. 5 is an end elevational view of the pressure roll bearing and spring-retaining bracket.

Fig. 6 is a graph relatively showing the yieldable pressure exerted by the torsion springs at various sprung positions of the springs due to different distances of separation of the sprung roll with respect to its companion roll or surface.

Fig. 7 is a view somewhat similar to Figure 1, showing another embodiment of my invention.

Fig. 8 is a view in perspective illustrating torsion springs capable of use in my invention.

Fig. 9 is a fragmentary horizontal sectional view taken axially through one end of the modified construction and embodiment shown in Fig. 7.

Fig. 10 is a view similar to Fig. 9 taken substantially at right angles thereto, or in a vertical plane.

Fig. 11 is a fragmentary perspective view of one end of the hollow sprung roller shaft employed in the embodiment shown in Figs. 7, 9 and 10.

Fig. 12 is a fragmentary end elevational view showing another modified embodiment of torsional spring structure.

Fig. 13 is a view similar to Fig. 11, illustrating another modified embodiment.

Fig. 14 is a fragmentary view in elevation showing a torsion spring end mounting capable of use with the embodiments of Figs. 12 and 13.

Fig. 15 is a fragmentary end elevational view disclosing another modified embodiment of my invention.

Fig. 16 is a fragmentary end elevational view disclosing still another embodiment of the invention.

Fig. 17 is a horizontal sectional view taken substantially axially through a sprung roll and illustrating another embodiment of my invention.

As has been stated, my present invention is adaptable for use on clothes wringers, and in many other connections where employment of a yieldably sprung roll is desirable; and, a number of different embodiments of this invention can be employed.

With the embodiment as illustrated in Figures 1 through 5 of the drawings, the supporting and framing structure includes the end members 1 and 2. As stated, this supporting and frame structure can be the frame of a clothes wringer, or any other suitable and desired apparatus, and since such structure will be well known to those skilled in the art, no attempt is here made to particularly disclose or describe exact framing and supporting parts.

The supporting frame end members 1 and 2 have a pressure roll 3 rotatably mounted in suitable bearings, and the shaft 4 of this roll 3 is provided with a drive gear 5, or with other suitable parts through which motion can be transmitted to rotate the pressure roll 3. This roll, and the mounting thereof, can be of substantially any standard or desired construction, and pressure roll 3 can be of rubber or other yielding material, or of substantially solid and non-elastic construction.

Sprung roll 6 is disposed alongside pressure roll 3, above or below, or laterally, or at any other desired position, and this sprung roll 6 is provided with an elongated tubular hollow shaft 7. In the present instance, I have illustrated the outer portion of the sprung roll 6, as being of rubber or other suitable cushioning material molded or otherwise assembled upon and around the elongated tubular hollow shaft 7; but, it will be understood that roll 6 can be constructed in any other desired and known manner.

The tubular hollow shaft 7 is mounted on end bearings 8 and 9, slidably held in suitable guideways 10 on the supporting frame end members 1 and 2, and the sprung roll 6 is thus supported alongside the pressure roll 3 and is movable toward and away from the roll 3 by sliding movement permitted through the end bearings 8 and 9 in the guideways 10. Those portions of end bearings 8 and 9 received in the guideways 10 are preferably made substantially rectangular, as is perhaps best shown in Fig. 5. The portions of the end bearings 8 and 9 on which the elongated tubular hollow shaft 7 is rotatably mounted are made substantially cylindrical, and these cylindrical portions can be provided with bearing rings 11 and 12. Bearing flanges 13 and 14 are provided on the end bearings 8 and 9 so that the elongated tubular hollow shaft 7, and consequently the sprung roller 6 carried thereby, will be rotatably mounted and will be restrained against endwise or axial movement.

The end bearings 8 and 9 have elongated substantially rectangular slots 15 and 16 formed substantially axially therethrough, and these elongated rectangular slots are provided with lateral grooves 17 and 18 on each side thereof, substantially as shown in Fig. 5. The number of sets or pairs of these lateral grooves 17 and 18 will correspond to the number of torsional springs desired to be used for the particular installation.

In the embodiment as disclosed, two torsional springs 19 are employed at one end of the sprung roll 6, and two torsional springs 20 are used at the other end. Obviously, a greater or lesser number of torsional springs can be employed.

The torsional springs can be made to be substantially duplicates, and these are conveniently formed of lengths of spring rod or wire, substantially cylindrical or of any other desired and suitable shape. Each torsional spring is made up of a single length of material bent in its middle to form a bight 21, with parallel spaced-apart side portions 22 and 23 extending in parallel relation therefrom. These parallel portions are of such length that when they are inserted endwise through the rectangular slot of one end bearing and are extended through the elongated tubular hollow shaft 7, the bight portion 21 will extend through and be exposed on the outer side of the opposite end bearing. These parallel side portions 22 and 23 are the torsion spring portions, and the ends of the torsional springs are bent substantially at right angles in the provision of spring arms 24 and 25. These spring arms 24 and 25 are angularly disposed in substantially flared relationship, and the extremities of the spring arms are bent inwardly to provide bearing pins 26 and 27 extending substantially parallel with the side portions 22 and 23. The construction and general assembly of the torsional springs 19 and 20 are perhaps best illustrated in Fig. 3, and it will be seen that these springs are substantially duplicates.

In assembling the parts, these torsional springs 19 and 20 are inserted from opposite ends through the elongated rectangular slots 15 and 16 of the end bearings 8 and 9, and the parallel side portions 22 and 23 are received in the lateral grooves 17 and 18. The parallel side portions 22 and 23 are of such length that when the bight 21 is positioned with its loop exposed beyond the outer side of one of the end bearings, the spring arms 24 and 25 are presented in flared relationship adjacent to the opposite end bearing, and on the outer side thereof. When the parts are assembled in this manner, keys or pins 28 and 29 are inserted through the loops of bights 21 and between the side portions 22 and 23, substantially after the manner shown in Fig. 4, and the torsional springs 19 and 20 are then held in the desired assembled relation. The fitting and sizing of the parts is such that the parallel side portions 22 and 23 are sufficiently free in the lateral grooves 17 and 18 to permit free torsional twist, and the keys or pins 28 and 29 will effectively hold the assembly and prevent displacement of the parts. These keys or pins 28 and 29 can be secured removably in place by screws 29, or other suitable fastenings. With the parts presented and assembled in this manner, the spring arms 24 and 25 are inclined diagonally and are flared outwardly, and the bearing pin ends 26 and 27 are presented inwardly. In the disclosure of Fig. 1, I have illustrated two torsional springs 19 at one end of the sprung roller 6, and two torsional springs at the other end, and these will possibly be disposed substantially as shown by the full and the dotted lines in Fig. 1. Arcuate slots 31 are provided through the outer sides of the supporting frame end members 1 and 2, on opposite sides of the guideways 10, in position to permit passage of the bearing pin ends 26 and 27, and these bearing pin ends are fitted through parallel openings formed substantially axially through bearing rolls 32 and 33. These bearing rolls are oscillatably mounted in suitable openings in the spring links or shackles 34 and 35 pivotally and swingably mounted, at 36 and 37, on the supporting frame end members 1 and 2. With this construction and assembly, as pressure is exerted between the pressure roll 3 and the sprung roll 6, substantially in the direction indicated by the arrows in Fig. 2, sprung roller 6 will be moved down to separate from pressure roll 3, the degree of separation depending upon the thickness of the material passing between the rolls. This downward movement of the sprung roll 6 is permitted by a flattening out of the angular disposition of the spring arms 24 and 25, substantially as illustrated in Fig. 2, and the spring links or shackles 34 and 35 swing to accommodate such flattening out spreading of the bearing pin portions 26 and 27 of the torsional springs 19 and 20. The spring arms 24 and 25 may yield or bow slightly; but the main spring effect is secured through torsional twisting of the parallel side portions 22 and 23, and the natural resiliency of the metal will cause the parts to be again restored to the position shown in Fig. 1, when the pressure or separating force exerted between the pressure roll 3 and the sprung roll 6 is removed.

The torsional springs 19 inserted from one end of the elongated tubular hollow shaft 7 will be offset above the torsional springs 20 inserted from the opposite end, substantially as shown by the dotted and full lines in Fig. 1, and for this reason it will be necessary to mount the spring links or shackles 34 and 35 in slightly different relative relation, as also shown by the dotted lines in Fig. 1. However, with the torsional springs 19 and 20 all of substantially the same general construction and characteristics, the spring suspension will tend to equalize at both ends and substantially throughout the entire length of the sprung roll 6. At the same time, since torsional springs 19 and 20 function independently, it will be possible for the sprung roll 6 to have greater distance of separation from the pressure roll 3 at one end than at the other, thus permitting free accommodation and adjustment to different thicknesses of material as presented throughout the length of the co-operating rolls.

The normal position of the parts when sprung roll 6 is in contact with pressure roll 3 is illustrated in Figure 1 of the drawings, and the relative movement and position of the parts when material is passing between the rolls 3 and 6 to force roll 6 downwardly, is illustrated in Fig. 2.

With the parts constructed and assembled in the manner set forth, all torsion springs take equal depression at each end of the sprung roll, depending upon the thickness of material passing between the pressure and the sprung roll, and this movement and torsional yielding of the torsion springs is controlled and is equalized by the movement of the spring links or shackles 34 and 35. When the springing force exerted against sprung roll 6 is removed, the several torsional springs will cooperate to restore the parts to the normal position.

On the graph, as illustrated in Fig. 6, I have indicated variations in the distance of separation of the sprung roll from the pressure roll, with indications of the variations in the roll pressures at each degree or distance of separation. These variations are expressed in one-quarter inch intervals or distances of separation, with the angularity of the spring arms 24 and 25 indicated by the lines 38, and the relative disposition of the spring links or shackles 34 and 35 indicated by the lines 39. As will be observed, beyond the one-inch mark of separation, the pressure variations are reduced so that on a two-inch roll gap the spring pressures are only 155 pounds, as contrasted with 381 pounds for a one-quarter inch roll gap. Thus it will be seen and will be understood that the roll pressure is almost constant for the first one inch of travel or separation, and after that the pressure is reduced materially. This function and result is substantially contrary to the usual pressure roll device, where pressures are built up to damaging and crushing forces; and, with my present invention the pressures are not built up to the damaging and crushing pressures as usually found in spring roll structures now in use, but the pressures are reduced. Thus, it will be seen that where my invention is embodied in a clothes wringer or similar structure, if an arm of the operator be caught between the rolls, the arm will not be crushed by extremely high pressures built up due to separation of the sprung roll from the pressure roll, but on the contrary as the separation increases, the pressure will be reduced, thus avoiding serious injury and enabling the operator to withdraw the hand or arm. At the same time, my improved structure provides almost constant roll pressure in the working ranges to thus assure efficient operation; but beyond the usual working ranges the pressure is reduced to thus assure against accidents or damage to persons or to the machine under unusual conditions of operation.

As shown in Fig. 6, the vertical line at the left hand side can be taken as representing the axial center line of the sprung roll in different degrees of separation, and the distance of separation is indicated in measurements of one-quarter inch. The pressure is indicated by the figures from 404 pounds progressively downwardly to 155.5 pounds, over a separation of substantially two inches of the sprung roll. From the pressure indicating figures it will be seen that there is relatively slight decrease in the operative pressure, the drop in the present example being from 404 pounds to 378 pounds. Then, increased travel or separation of the sprung roll results in a relatively rapid decline in the pressure, with the present example ending at 155 pounds where there is two inches of deflection or separation. It will be understood that the present graph is representative of one embodiment of the invention, and it will be readily seen that any change in the length or size or strength of the torsion portions of the torsional springs, and variations in the length of the arms and the angle of inclination of these arms of the torsional springs will result in a different series of pressures. Thus, by changing any or all of these factors, and by changes in the number of torsional springs employed, an almost infinite number of pressure combinations can be secured.

As has been stated, a greater or lesser number of torsional springs can be employed, and with the modified embodiment as illustrated in Figs. 7, 9 and 10, I employ three torsional springs 40 at one end and three torsional springs 41 at the other end. This modification requires that each end spring bearing 42 be provided with a corresponding number of sets of the lateral grooves corresponding to grooves 17 and 18. Otherwise, the assembly of the torsional springs on the various parts is substantially the same as set forth in connection with the disclosure of Figure 1.

Obviously, four or more torsional springs can be employed at each end of the sprung roll, and the arrangement and assembly can be similar to that disclosed. Where three or more torsional springs are used at each end, it may be necessary to provide a slightly different arrangement than the spring links or shackles as disclosed in the embodiment of Fig. 1. Referring to Figs. 7, 9 and 10, it will be seen that in place of the bearing rolls 32 and 33, the bearing pin ends of the several torsional springs are fitted in spaced-apart openings in the suspension links 43 and 44 pivoted on the outer ends of the swinging arms 45 and 46, these arms being pivotally mounted at bearings 47 and 48 on the supporting frame end members.

With the embodiment illustrated in Figs. 7, 9, 10 and 11, another variation in the structure is included. With this construction, elongated tubular hollow bearing shaft 49 is employed in place of the individual end bearings 8 and 9, and the hollow elongated tubular shaft 50 of the sprung roll is revoluble on the tubular bearing shaft 49. If desired, bearing sleeves 51 can be provided on bearing shaft 49, on which the hollow shaft 50 of the sprung roll will rotate. The elongated tubular hollow bearing shaft 49 extends entirely through the length of the sprung roll, and the ends of this bearing shaft 49 terminate in rectangular reduced portions 52, which are slidably received in guideways on the supporting frame structure. These rectangular reduced portions 52 are open to receive and hold the end spring bearings 42, and thus the end spring bearings are positioned and mounted to receive and to properly hold and support the torsional springs 40 and 41. With this construction, the elongated tubular hollow bearing shaft 49 serves as end bearings for the sprung roll, and at the same time this elongated bearing shaft provides a rigid central bearing structure with an opening to receive and house torsion portions of the torsional spring.

The use and functioning of this modified construction will be substantially the same as described above in connection with the disclosure of Figure 1, and as the number of torsional springs employed is increased, the spring force of the sprung roll can be increased. However, in some instances it may be found desirable to use a greater number of relatively lighter or softer torsional springs, and greater resiliency and softer spring action may result.

With the embodiment illustrated in Fig. 12, the bearing pin ends of the torsional spring 53 are slidably received in elongated slotted openings 54 and 55 formed in the supporting frame end members.

With the modified embodiment illustrated in Fig. 13, the torsional springs 56 have the bearing pins at one end of the spring arms pivoted on the supporting frame end members, as at 57, and the ends of the other spring arms are slidably received through slots 58. Thus, the angle of disposition of the spring arms can be varied and the sprung roll can separate from the pressure roll to such distance as may be necessary or desirable.

In Fig. 14, I have illustrated the bearing pin end 59 of the torsional spring as having a bearing roller 61 thereon received in a slot 62 of the supporting frame end member, and this construction lends itself well to employment with the embodiments illustrated in Figs. 12 and 13.

With the modified construction disclosed in Fig. 15, the spring arms 63 of the torsional spring 64 are provided with bowed portions 65. The bearing pin ends of this torsional spring 64 are fitted through bearing openings, as at 66, in the supporting frame end members, and flexing or springing of the arms 63 will occur when the sprung roll is under working pressure.

With the modified embodiment disclosed in Fig. 16, the spring arms 67 of the torsional spring 68 are curved so that they will be inherently yieldable, and the shackle links 69 and 70 are pivotally suspended from their upper ends with the arms 67 of the torsional spring 68 connected with the lower swinging ends of these shackle links.

In the modified embodiment of my invention disclosed in Fig. 17, the torsional springs 71 and 72 at each end of the sprung roll 74 extend only part way through the elongated tubular shaft 73. The parallel portions 75 and 76 of the torsional springs 71 and 72 extend through the openings of the end bearings 77 in substantially parallel arrangement, with their inner ends terminating near the middle of the elongated tubular shaft, or these torsional springs 71 and 72 can be disposed in the staggered or offset relation as explained in connection with the embodiments heretofore described. As here disclosed, a center block 78 has recesses 79 and 80 in opposite ends thereof shaped to receive the bight portions at the inner ends of the torsional springs 71 and 72. Thus, the center block 78 holds the shorter torsional springs in proper assembly, and these springs will function much after the manner of the torsional springs as hereinbefore explained. Obviously, a plurality of torsional springs 71 and 72 can be used at each end of the sprung roll 74, and the parallel portions 75 and 76 thereof will be effectively enclosed and housed within the elongated tubular shaft 73.

In the illustration of the present embodiments of my invention, I have disclosed and described the sprung roll in conjunction with a pressure roll; but, it will be understood that the pressure roll can be dispensed with and the sprung roll can be used in connection with a flat pressing or other flat or other shaped surface. No attempt is here made to illustrate a sprung roll according to my invention in conjunction with a flat or other surface, since many such uses and embodiments will be readily apparent to those skilled in the art.

From the foregoing it will be seen that I have provided a springing device for pressure rollers which is of simple and inexpensive construction, adaptable for use on clothes wringers, pressing machines, and in many other connections where a sprung roll is desired; and, it will be possible to assemble the parts and construct the various embodiments in such manner that my invention can be used to accomplish different pressures and different degrees of springing resiliency to suit different and particular conditions of use. It will also be seen that with my construction the bearing of the sprung roll is substantially centered and contained within the roll, and the parts are housed within the hollow elongated roll structure and the bearing shaft therefor.

While I have herein shown and described only certain specific embodiments and adaptations, and have suggested only certain possible modifications, it will be appreciated that many changes and variations can be made in the form, construction, and assembly of the parts, and in the manner of use, without departing from the spirit and scope of my invention.

I claim:

1. In a pressure roller device, supporting structure, a pair of co-acting rolls one of which has a hollow shaft, and torsional spring means extending into the hollow shaft and having an end extending from the hollow shaft and bent laterally and bearing on the supporting structure.

2. In a pressure roller device, supporting frame structure, a sprung roll having a hollow shaft, and torsional spring structure having an elongated portion extending into the hollow shaft and on which said hollow shaft is mounted and having laterally extending arm portions bearing at their outer ends on the supporting frame structure.

3. In a pressure roller device, supporting frame structure, a pair of co-acting rolls one of which is journaled on the supporting frame structure and the other of which has a hollow shaft, and torsional springs having elongated portions extending into the ends of said hollow shaft and having arms extending outwardly and laterally from the hollow shaft and having their ends supported on the frame structure.

4. In a pressure roller device, supporting frame structure, a roll having a hollow center, and a plurality of torsional springs each consisting of an elongated spring member having a bight in its middle portion with parallel side bars extending therefrom and with the ends extending laterally and angularly as spring arms, said springs having the parallel portions thereof received within the hollow of the roll and having the arm portions bearing on the supporting frame structure.

5. In a pressure roller device, supporting frame structure, a pair of co-acting rolls one of which is journaled on the supporting frame structure and the other of which is provided with a hollow shaft, and torsional springs provided with elongated torsion portions extending into the ends of the hollow shaft and having branched spring arms bearing and movably supported on the supporting frame structure.

6. In a pressure roller device, supporting frame structure, a pair of co-acting rolls one of which is journaled on the supporting frame structure and the other of which has a hollow shaft, end bearings in said hollow shaft, said end bearings having spring receiving openings therethrough aligned substantially axially, and torsional springs having elongated torsional spring portions extending through the openings of the end bearings and through the hollow shaft and having angularly disposed spring arms at the ends of said shaft and bearing on the supporting frame structure.

7. In a pressure roller device, supporting frame structure, a roll having a hollow shaft, end spring bearings in said hollow shaft provided with aligned openings, and torsional springs having elongated spring portions extending through said shaft and held in the openings of the end bearings and provided with angularly extending and disposed spring arms movably supported by a portion of the frame structure.

8. In a pressure roller device, a supporting frame structure, a sprung roll having a hollow shaft, and torsional springs having elongated torsion portions thereof extending through the sprung roll and having angularly extending arms at each end of the sprung roll extending and spread laterally and bearing at their outer ends upon a portion of the supporting frame structure.

9. In a pressure roller device, a supporting frame structure, a pair of coacting rolls one of which is journaled on said supporting frame structure as a pressure roll and the other of which serves as a sprung roll, and torsional springs having elongated spring portions terminating at one end in a bight with parallel side portions upon which the sprung roll is journaled, said torsional springs having the ends of the parallel portions branched laterally outside the ends of said sprung roll and connected with the supporting frame structure to yieldably mount said sprung roll thereon.

10. In a pressure roller device, supporting frame structure, a pressure roll journaled across the supporting frame structure, a sprung roll disposed in co-acting relationship to the pressure roll, end bearings on which said sprung roll is journaled, said end bearings having openings therethrough aligned axially, torsional springs having elongated spring portions inserted endwise through the aligned openings of the end bearings and provided with spring arms extending angularly and laterally at the ends of the sprung roll, and means movably supporting the ends of said spring arms on the supporting frame structure.

11. In a pressure roller device, a supporting frame, a pressure roll journaled across said supporting frame, a sprung roll having a hollow shaft, end bearings on which said shaft is journaled, said end bearings having aligned openings therethrough, torsion springs having elongated portions fitting through the aligned openings of the end bearings and provided with laterally extending spread arms, and shackle links by which the ends of said arms are mounted on the supporting frame structure.

12. In a pressure roller device, a supporting frame structure, a pressure roll journaled across said supporting frame structure, a sprung roll, torsional springs having portions on which said sprung roll is journaled in co-acting disposition with respect to the pressure roll and having end portions bent out and extending laterally, and links on the supporting frame structure by which the end portions of said torsional springs are held yieldably.

13. A springing device for pressure rollers comprising a supporting frame structure, a pressure roll journaled across the supporting frame structure, a sprung roll having a hollow shaft, end bearings at the ends of said hollow shaft, said end bearings having aligned openings therethrough, torsional springs each consisting of an elongated member having a bight in its middle portion with side spring portions extending in parallel relation therefrom and terminating in laterally extending spring arms having bearing pins at their extremities, said torsional springs having the elongated parallel side portions thereof fitted through the aligned openings of the end bearings with the spring arms disposed at opposite ends of the sprung roll, and shackle links swingable on the supporting frame structure with which the bearing pins are connected.

14. A springing device for pressure rollers comprising a supporting frame structure, shackle links pivotally supported on the supporting frame structure, a pair of co-acting rolls one of which is rotatably mounted on the frame and the other of which has a hollow shaft mounted on end bearings, and torsion springs fixedly connected with the end bearings and extending through the shaft and rotatably mounting the hollow shaft roll, said torsional springs having spring arms at each end of the hollow shaft supported on the shackle links.

15. A springing device for pressure rollers comprising a supporting frame structure, a pressure roll journaled across said supporting frame structure, a sprung roll in co-acting relationship to said pressure roll, said sprung roll having a hollow shaft, end bearings at the ends of said hollow shaft on which said sprung roll is mounted for rotation, said end bearings having elongated substantially rectangular openings formed axially therethrough with a plurality of lateral grooves on each side, a plurality of torsional springs each having a bight in its middle portion with elongated side portions extending in parallel relation therefrom and with the torsional spring having laterally disposed spring arms terminating in bearing pins, the parallel side portions of said torsional springs being dimensioned to be fitted endwise through the elongated tubular hollow shaft to be held in the lateral grooves of the end bearings and with the bight portion extending outside the end bearing, keys fitted through said extending bight and intermediate the parts of the parallel portions, and shackle links pivoted on the supporting frame structure with which the bearing pins are pivotally connected.

16. A springing device for pressure rollers comprising a supporting frame, a pressure roll rotatably mounted across said supporting frame, said supporting frame being provided with guideways aligned with the bearing mountings of the pressure roll, a sprung roll having an elongated tubular hollow shaft, end bearings on which said hollow shaft is journaled, said end bearings having portions slidably received in said guideways and having openings extending axially therethrough and provided with lateral grooves on each side, a plurality of torsional springs each consisting of an elongated spring member having a bight in its middle portion with side portions extending in substantially parallel relation therefrom for a distance in length greater than the length of the hollow shaft and said torsional springs being provided with laterally extending spread spring arms beyond the parallel side portions and terminating in bearing pins, at least two torsional springs being assembled at each end of the sprung roll with the elongated parallel portions thereof fitting through the openings of the end bearings and received in the lateral grooves on opposite sides and with the bight portion extending beyond the outer side of the opposite end member, keys fitted through the extending bights of the torsional springs at each end of the sprung roll, and shackle links swingably mounted on the supporting structure and with which the bearing pin ends of the torsional springs are pivotally connected.

17. A springing device for pressure rollers comprising a supporting frame structure, a sprung roll having a hollow shaft, end spring bearings at the ends of said hollow shaft, said end spring bearings having aligned spring-receiving openings therethrough, torsional springs each consisting of an elongated member having a bight in its middle portion with side spring portions extending in substantially parallel relation therefrom and terminating in laterally angularly extending spring arms having bearing pins at their extremities, said torsional springs having the elongated parallel side portions thereof fitted through the aligned openings of the end spring bearings with the spring arms disposed at opposite ends of the sprung roll, and shackle links swingable on the supporting frame structure with which the bearing pins are connected.

18. In a pressure roller device, a supporting frame structure, a sprung roll having a hollow center, an elongated hollow bearing shaft on which said sprung roll is rotatable, said supporting frame structure having guideways therein and the elongated hollow bearing shaft having substantially rectangular portions at its ends received in said guideways, spring end bearings in said rectangular portions of the bearing shaft, said spring end bearing portions being provided with aligned spring receiving openings extending substantially longitudinally of the bearing shaft, a plurality of torsional springs each consisting of an elongated spring member having a bight in its middle portion with parallel side bars extending therefrom and with the ends extending laterally and angularly as spring arms, said springs having the parallel portions thereof received through the aligned openings of the end spring bearings and having the arm portions extending angularly at each end of the sprung roll, and links pivotally mounted on said supporting frame structure and having the end of the spring arms connected with swingable portions thereof.

ALLEN J. PATCH.

REFERENCES CITED

The following references are of record in the file of this patent:

UNITED STATES PATENTS

| Number | Name | Date |
|---|---|---|
| 229,107 | Dudley | June 22, 1880 |
| 1,356,186 | Bodge | Oct. 19, 1920 |
| 2,181,316 | Etten | Nov. 28, 1939 |